March 13, 1928.
A. W. OTOUPAL
1,662,325
BEARING FOR DISK CULTIVATORS
Filed May 11, 1926
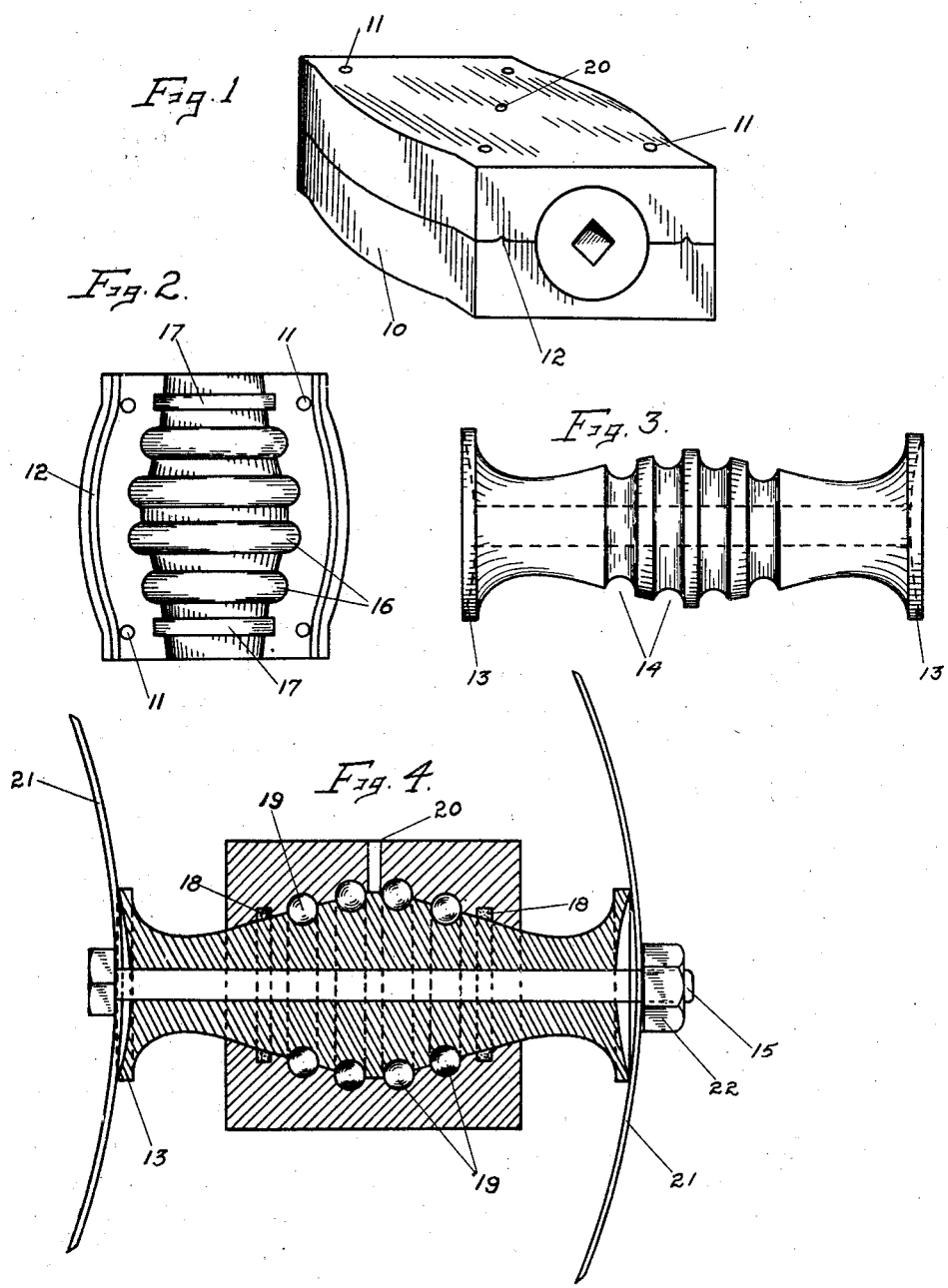
A.W. OTOUPAL INVENTOR.
BY Emil F. Lange
ATTORNEY.

Patented Mar. 13, 1928.

1,662,325

UNITED STATES PATENT OFFICE.

ANTON W. OTOUPAL, OF ULYSSES, NEBRASKA, ASSIGNOR TO T. M. OTOUPAL, E. A. OTOUPAL, AND G. F. OTOUPAL, ALL OF ULYSSES, NEBRASKA.

BEARING FOR DISK CULTIVATORS.

Application filed May 11, 1926. Serial No. 108,350.

My invention relates to bearings, and more particularly to the bearings for the disks of disk cultivators, and it is my object to provide such a bearing for the disks that it will be practically frictionless, that it may be conveniently and effectively lubricated, and particularly that it will not be affected by the rough usage to which cultivator disks are necessarily subjected.

Having in view these objects and others which will be pointed out in the following description, I will now refer to the drawings, in which Figure 1 is a view in perspective of the journal box and showing also the end of the spindle.

Figure 2 is plan view of one portion of the journal box showing the interior thereof.

Figure 3 is a plan view of the spindle.

Figure 4 is a view in section of the spindle and the journal box and of a pair of disks secured to the spindle.

The journal box 10 as shown in Figure 1 is made up of two complementary parts which are secured together by means of bolts or other fastening devices passing through the apertures 11. The two parts of the journal box are also provided with a tongue and groove connection 12 for preventing the leakage of lubricant.

The spindle as shown in Figures 3 and 4 is spool shaped having heads 13 and having its spindle portion in the shape of a double cone. Grooves 14 are cut in the conical walls of the spindle, the grooves in section being substantially semi-circular. The heads 13 of the spindle are concave in their end surfaces as shown in Figure 4 and as further shown in dotted lines in Figure 3. The spindle is lengthwise and centrally apertured for receiving a square shaft 15.

Each portion of the journal box is provided with a depression extending lengthwise thereof, the depression having substantially the form of the body portion of the spindle. Grooves 16 are complementary with the grooves 14 of the spindle and they are positioned to register with the grooves 14 when the spindle is seated in the journal box. Additional grooves 17 are provided in the journal box for seating washers 18 which surround the spindle and which prevent the leakage of lubricant. The washers 18 are preferably made of felt but any other suitable material such as cork, leather or ordinary packing may be substituted for the felt.

In assembling the two parts of the journal box and the spindle, the spindle is placed in position in one of the halves of the journal box with the grooves 14 registering with the grooves 16, and steel balls 19 are placed in these grooves. It is not necessary that the steel balls 19 entirely surround the spindle since they will furnish sufficient bearing if they extend only half-way around. If desired, they may be arranged so as to entirely surround the spindle. The washers 18 are then placed in position entirely surrounding the spindle, after which the two parts of the housing are bolted together. The housing is additionally provided with an aperture 20 and a channel extending to the bearings, the aperture 20 being adapted to receive a grease cup or a nipple fitting whereby lubricant may be introduced into the bearing without disassembling the bearing.

The bearing is designed primarily for use with disks of a disk harrow and the manner of securing the disks to the spindle is shown in Figure 4. The disks 21 are both dished in the same direction, and since the end surfaces of the spindle are both concave, one of the disks will be partially seated within the concave end while the other is entirely outside of the concave end of the spindle. The square shaft 15 passes through the central apertures in both of the disks and through the central aperture of the spindle and the parts may then be secured in position by tightening the nut 22 which binds both disks to the ends of the spindle.

The bearing is practically frictionless since the spindle has no direct contact with the journal box but only an indirect contact through the anti-friction walls 19. The lateral strains which are so common in disk harrows and cultivators are taken care of by the double cone surface of the spindle and of the journal box, so that there is little or no unequal wear such as would otherwise destroy the bearing. Lubrication through the aperture 20 is a very simple matter.

Having thus described my invention in such full, clear, and exact terms that its construction and operation will be readily understood by others skilled in the art to which it pertains, what I claim as new and desire to secure by Letters Patent of the United States is:

A bearing for a disk cultivator comprising a two-part journal box having in each part a longitudinal depression gradually increasing in depth from its ends to its middle portion, and having in the depression longitudinally spaced bearing grooves and washer grooves near the ends of the depression, a part of the journal box having an oil aperture therethrough leading to the deeper portion of the depression, a spindle of substantially spool shape of a length to extend through and beyond the journal box and having its intermediate portion gradually increasing in diameter from its ends to its central part to conform to the depressions in the journal box, said spindle having bearing grooves in its intermediate portion corresponding to the grooves in the depressions, bearings in the corresponding intermediate grooves, packing washers in the corresponding end grooves, the flanges at the ends of the spindle having concave faces to receive cultivator disks thereagainst, and a bolt for engagement axially through the spindle and through the disks to clamp the latter directly on the spindle.

In testimony whereof I affix my signature.

ANTON W. OTOUPAL.